United States Patent Office 2,850,506
Patented Sept. 2, 1958

2,850,506
PURIFICATION OF ETHYLENIC COMPOUNDS

Fred E. Boettner, Philadelphia, Pa., assignor to Rohm & Haas Company, Philadelphia, Pa., a corporation of Delaware No Drawing. Application December 18, 1956
Serial No. 628,958

9 Claims. (Cl. 260—326.5)

This invention deals with a method for purifying polymerizable ethylenic compounds. It has been discovered that ethylenic compounds which are prone to polymerize, particularly when heated, can be efficiently purified by volatilizing them in the presence of a fulvene having at least one aromatic group attached on the methylenic carbon atom thereof, that is, at the 6-position.

It is known that many ethylenically unsaturated compounds can be stabilized with polymerization inhibitors. Some of the inhibitors which are used for stabilizing these compounds during shipping and storage are effective only in the absence of oxygen. Many are effective only in the presence of oxygen, including air as a source of oxygen. Thus, many of the commonly used inhibitors are but poorly effective or are ineffective when polymerizable monomers are distilled or sublimed. Some common inhibitors pass along with vapors during distillation in variable amounts so that distillation is not a sure or practical way of providing pure, uniform monomers. Furthermore, when it is desired to stabilize or purify ethylenically unsaturated monomers which contain a reactive functional group, it is very difficult to find an inhibitor which is effective, as most of the usual inhibitors possess reactive groups which can combine with the reactive group of such a monomer.

It has now been discovered that polymerizable ethylenically unsaturated monomers can be desirably and effectively volatilized in the presence of a small amount of a fulvene of the formula

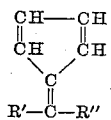

wherein R' represents an aromatic group of not over two cycles and R" represents such an aromatic group or an alkyl group, preferably of not over four carbon atoms. These fulvenes serve as effective polymerization inhibitors whether oxygen (air) is present or not. There is no reaction between a reactive group or groups in the monomers and these inhibitors. These inhibitors do not pass over with the distillate and if, by chance, any of the inhibitor should be mechanically carried over, this immediately becomes apparent because the fulvenes are highly colored and color would then appear in the distillate. The thus purified monomer can be polymerized with a minimum of initiator and can be treated in a highly uniform manner with certainty of outcome. On the other hand, if the distilled monomer is to be stored or shipped, it can be treated with a uniform proportion of a selected inhibitor and thereafter utilized in a standard way with an improved certainty of result.

The effective fulvenes must have at least one aromatic group in the 6-position and may have two, which may be the same or different. The aromatic group may be phenyl or naphthyl and may have one or more substituents, such as chloro, bromo, alkyl, alkoxy, or phenyl. Typical useful fulvenes are 6-methyl-6-phenylfulvene, 6,6-diphenylfulvene 6-ethyl-6-phenylfulvene, 6-propyl-6-phenylfulvene, 6 - methyl-6-phenylfulvene, 6-methyl-6-p-chlorophenylfulvene, 6-butyl-6-p-chlorophenylfulvene, 6 - methyl-6-p - methylphenylfulvene, 6 - methyl-6-p-tert-butylphenylfulvene, 6 - methyl-6-tert-octylphenylfulvene, 6,6-di(p-chlorophenyl)fulvene, or 6,6 - di(p-methylphenyl)fulvene.

The amount of an aromatically substituted fulvene to be used can vary from 0.01% to 10% of the weight of the monomer. Usually an amount from about 0.1% to about 5% will be used.

Ethylenically unsaturated compounds which are effectively inhibited with a 6-aromatically substituted fulvene include a great variety of polymerizable monomers. These compounds may be hydrocarbons, esters, amides, nitriles, sulfides, lactams, acid halides, or compounds having an isocyanate, isothiocyanate, urea, or urethane grouping, or other vinylidene or active ethylenically unsaturated compounds. The most valuable effects of the above described fulvenes are obtained in dealing with high boiling polymerizable compounds or with polymerizable ethylenic compounds having a reactive group.

Typical esters which may desirably be volatilized from a mixture of ester and a defined fulvene include the alkyl, cycloaliphatic, including cycloalkyl and terpenyl, aralkyl, alkenyl, and aryl esters of acrylic, α-methacrylic, α-chloroacrylic, α-cyanoacrylic, α-phenylacrylic, itaconic, maleic, fumaric, or other polymerizable ethylenically unsaturated acid or such esters having a substituent group or groups non-hydrocarbon in nature and based on oxygen, sulfur, nitrogen, or a halogen. Examples of such esters are methyl acrylate, methacrylate, chloroacrylate, or itaconate; butyl, isobutyl, sec-butyl, or tert-butyl acrylate, methacrylate, or itaconate; hexyl acrylate, methacrylate, or dihexyl maleate; octylacrylate, methacrylate, or dioctyl maleate; dodecyl acrylate, methacrylate, or didodecyl itaconate; hexadecyl acrylate; octadecyl acrylate, or methacrylate, or corresponding maleate, fumarate, or itaconate; cyclohexyl, trimethylcyclohexyl, chlorocyclohexyl, or butylcyclohexyl acrylate, methacrylate, or corresponding maleate; benzyl, methylbenzyl or chlorobenzyl acrylate or methacrylate; phenyl, chlorophenyl, dichlorophenyl, tolyl, xylyl, butylphenyl, or methylchlorophenyl acrylate or methacrylate; dicyclopentenyl, dicyclopentyl, or terpenyl acrylate, methacrylate, or corresponding itaconate, or maleate; methoxyethyl, butoxyethyl, phenoxyethyl, benzoxyethyl, dodecyloxyethyl, ethoxypropyl, octoxypropyl, chlorophenoxypropyl, ethoxyethoxyethyl, butoxyethoxyethyl, or butylphenoxyethoxyethyl acrylate, or methacrylate; hydroxyethyl, hydroxypropyl, or hydroxybutyl acrylate or methacrylate; dimethylaminoethyl, tert-butylaminoethyl, tert-octylaminoethyl, morpholinoethyl, or tert-octylaminopropyl acrylate or methacrylate; isocyanatoethyl acrylate or methacrylate; ethoxycarbamylethyl acrylate or methacrylate; cyanoethyl acrylate or methacrylate; allyl acrylate, methacrylate, or corresponding maleate; vinoxyethyl acrylate or methacrylate; undecenyl acrylate or methacrylate; nitropropyl acrylate or methacrylate; or other volatilizable monomeric esters of polymerizable ethylenically unsaturated esters.

Similarly, there may be used vinyl esters of carboxylic acids, such as vinyl acetate, vinyl propionate, vinyl laurate, or vinyl oleate, or vinyl crotonate, vinyl 4-pentenoate, or vinyl sorbate.

Amides of unsaturated acids are particularly advantageously purified by distilling or subliming them in the presence of an above-defined fulvene. The amide may be unsubstituted, as acrylamide or methacrylamide or it may have one or two N-subtituents, as in N-methylacrylamide, N,N-dimethylacrylamide, N-n-butylmethacrylamide, N-phenylmethacrylamide, N-cyclohexylacrylamide, N - cyclohexyl - N - methylacrylamide, N - benzyl - N-methylmethacrylamide, N-allylacrylamide, N-n-dodecylacrylamide, N-n-dodecylmethacrylamide, N,N-diphenylacrylamide, N-acrylylmorpholine, N-methacrylylpiperidine, N,N'-ethylenebisacrylamide, or N-vinyloxyethylacrylamide. Amides and imides of divalent acids may likewise be so treated such as maleimide, N-methyl maleamic acid, N-butylmaleamic acid, N-benzylmaleamic acid, N-butylmaleimide, N-benzylmaleimide, N-allylmaleimide, or N-phenylmaleimide. The unsaturation may be in the N-substituent as well as in the acid residue as in N-vinylphthalimide or N-vinylsuccinimide. Lactams may likewise advantageously be considered, such as N-vinylpyrrolidinone, N-vinylpiperidinone, or N-vinylcaprolactam, and alkyl substituted N-vinyllactams. Similarly, methylene lactones can be advantageously purified by the method of this invention, such as methylenebutyrolactone.

Anhydrides and acids also come into consideration and also the acid halides, the last benefiting greatly by distillation from a mixture containing a defined fulvene.

Another type of vinylidene compound which may advantageously be purified by distilling in the presence of a defined fulvene comprises the vinyl thioethers, among which there are some sensitive compounds. There may thus be treated butyl vinyl thioether, hydroxyethyl vinyl thioether, cyclohexyl vinyl thioether, benzyl vinyl thioether, tert-dodecyl vinyl thioether β,N,N-dimethylaminoethyl vinyl thioether, or ethylene ureidoisobutyl vinyl thioether.

There are numerous other polymerizable vinylidene compounds and also α,β-unsaturated compounds which can advantageously be distilled or sublimed in the presence of a defined fulvene. These include acrylonitrile, methacrylonitrile, β-chloroacrylonitrile, styrene, p-chlorostyrene, vinylpyridines, and 2-vinylthiophene.

The 6-aromatically substituted fulvenes are highly effective in inhibiting polymerization of poly-ethylenically unsaturated compounds, some of which have been noted above, as well as the more numerous instances of monoethylenically unsaturated polymerizable compounds.

Typical illustrative procedures for purifying ethylenically unsaturated compounds by volatilizing them in the presence of a 6-aromatically substituted fulvene follow. Parts are by weight unless otherwise designated.

*Example 1*

There are mixed 100 grams of uninhibited commercial methyl methacrylate and 0.1008 gram of 6,6-diphenylfulvene. The mixture is an orange red. It is subjected to reduced pressure and heated. Distillation begins with a pot temperature of 48° C. and a vapor temperature of 45° C. at 175 mm. pressure and is continued to 74° C. pot temperature and 70° C. vapor temperature with a dry point at 85° C. at a pressure of 200 mm. The yield is 99 grams.

The uninhibited methyl methacrylate cannot be distilled under the same conditions, as it forms polymer.

A sample of the above distilled methyl methacrylate is treated with 0.1% of benzoyl peroxide and placed in a sealed tube and gradually warmed; at 60° C. complete polymerization occurs.

The distillation of methyl methacrylate is repeated with use of 0.2 gram of 6-naphthyl-6-phenylfulvene per 100 grams of the ester. Over 99 grams of distilled ester is obtained.

*Example 2*

A mixture of 225 grams of β-propoxyethyl acrylate and 0.5 gram of 6,6-bis(chlorophenyl)fulvene is heated under reduced pressure. Monomer distills over smoothly and a yield of 86% is obtained of pure propoxyethyl acrylate. Without the added fulvene yields are about 50% and variable.

*Example 3*

There are mixed 297 grams of crude 2-ethylhexyl methacrylate and 0.5 gram of 6,6-bis(p-chlorophenyl)fulvene. The mixture is fractionally distilled under reduced pressure. At 69° C./1.0 mm. a fraction of 169 grams of pure 2-ethylhexyl methacrylate is obtained. Without the fulvene the yield runs about half of this.

Distillation of cetyl methacrylate at 176°–193° C./1 mm. with di-β-naphthol gives products which contain variable amounts of the inhibitor. On the other hand, cetyl methacrylate distills in the presence of a 6,6-diphenylfulvene in an 88% yield without color being carried over.

*Example 4*

There are reacted by heating β-butoxyethanol and methyl methacrylate in the presence of sodium methoxide as catalyst. Methanol is distilled off. To 150 grams of the reaction mixture is added 0.5 gram of 6-p-chlorophenyl-6-methylfulvene and the mixture is fractionally distilled. At 62° C./0.8 mm. a fraction of 124 grams of pure β-butoxyethyl methacrylate is obtained.

*Example 5*

In the preparation of isocyanatoethyl methacrylate, according to the procedure of United States Patent 2,718,516, the compound

$$CH_2=C(CH_3)COOC_2H_4NHCOOC_2H_5$$

is mixed with mineral oil and PCl₅ and heated. Volatile materials are taken off under reduced pressure. The reaction mixture is then treated with 12 parts of 6,6-diphenylfulvene and heating continued to 170° C. pot temperature, with the pressure reduced and with the receiver chilled by an acetone-solid carbon dioxide mixture. Heating at this temperature is continued until no more product distills. The crude product is then mixed with one-tenth part by weight of 6,6-diphenylfulvene and flash distilled. Yields of 85% to 90% of isocyanatoethyl methacrylate are obtained.

*Example 6*

For the preparation of N-methylmaleimide there is taken 129 parts of N-methylmaleamic acid, which is placed in a reaction vessel in an oil bath. The bath is heated to give a pot temperature of 285° C. while the pressure is reduced to 0.5 mm. A white solid sublimes and is collected in an amount of 14 parts. It is the desired N-methylmaleimide in a yield of 13%.

This procedure is repeated with 115 parts of N-methylmaleamic acid to which is added one part of 6,6-bis(p-chlorophenyl)fulvene. The white solid is collected, recrystallized from methanol, and dried. The amount of N-methylmaleimide is 38.5 parts or about a 29% yield.

The above procedure is repeated with N-dodecylmaleamic acid heated to 220° C. at 0.2 mm., at which temperature a yield of 16% is obtained without addition of the fulvene. With addition of fulvene the yield is 42%.

*Example 7*

There are mixed 72 parts of acrylic acid, 282 parts of benzoyl chloride and 0.5 part of 6,6-bis(p-chlorophenyl)-fulvene. The mixture is heated and rapidly distilled through a packed column. Distillation is discontinued when the overhead temperature reaches 85° C. The receiver in which the distillate is collected contains 0.5 part of the above fulvene. The first distillate is fractionally redistilled and at 74°–75° C. there is obtained pure acrylyl chloride in a yield of 79%.

Repetition of the above procedure without inhibitor gives a yield at best of 58%. Repetition with 0.5 part of hydroquinone in place of the above fulvene gives a 65% to 70% yield.

Example 8

Crude methacrylamide is charged to a pot equipped with stirrer. An amount of 6-phenyl-6-methylfulvene of 0.25% of the weight of the crude methacrylamide is added. The pot is heated with an oil bath, which is carried to 150° C. while the pressure in the pot is reduced to about 2 mm. Solid methacrylamide, melting at 110°–112° C., sublimes in a yield of 80%.

The sublimation is repeated with another portion of crude methacrylonitrile. In this case the bath is heated to 170° C. with the pressure at 8 mm. The yield of pure methacrylonitrile is 75%.

Several sublimations under the above conditions, but without the inhibitor, give yields of 1% to 10%.

In the same general way there may advantageously be sublimed N-benzylacrylamide, melting at 67° C., N,N-dicyclohexylacrylamide, melting at 76° C., N-phenylacrylamide, melting at 104°–105° C., N-vinylphthalimide, melting at 82.6° C., and other solid amides and imides. In the absence of an aromatically substituted fulvene yields are unsatisfactory and highly variable, whereas in the presence of a small amount of such fulvene, yields are good. Lack of color in the sublimed products demonstrates that these inhibitors are not carried over.

Example 9

In the purification of 1,3-butylene dimethacrylate, about 0.3% of 6,6-bis(4-chlorophenyl)fulvene is added and the resulting mixture is distilled with the main fraction taken at 117° C./5 mm. to give a pure product with minimum interference and loss through polymerization.

The same procedure can be advantageously applied in purifying other divinylidene compounds which are prone to polymerize with cross-linking.

I claim:

1. In the preparation and purification of a volatile, polymerizable ethylene compound, the improvement of vaporizing a said ethylenic compound by heating it in a mixture with a fulvene of the formula

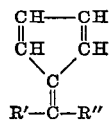

wherein R' represents a member of the class consisting of the phenyl, chlorophenyl, bromophenyl, alkylphenyl with up to eight carbon atoms in the alkyl portion thereof, phenylphenyl, and naphthyl groups and R" represents a member of the class consisting of phenyl, chlorophenyl, bromophenyl, alkylphenyl with not over eight carbon atoms in the alkyl portion thereof, phenylphenyl, and alkyl groups of not over four carbon atoms, the amount of said fulvene being at the start of the heating between 0.01% and 10% of the weight of the said ethylenic compound and condensing the vapors of said ethylenic compound.

2. In the process of preparing a distillable polymerizable ethylenic compound the improvement of heating a said ethylenic compound in contact with a fulvene until vapors of said ethylenic compound are formed and condensing and collecting said vapors, the fulvene having the formula

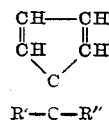

wherein R' represents a member of the class consisting of the phenyl, chlorophenyl, bromophenyl, alkylphenyl with up to eight carbon atoms in the alkyl portion thereof, phenylphenyl, and naphthyl groups, and R" represents a member of the class consisting of phenyl, chlorophenyl, bromophenyl, alkylphenyl with not over eight carbon atoms in the alkyl portion thereof, phenylphenyl, and alkyl groups of not over four carbon atoms, the amount of said fulvene being at the start of the heating between 0.01% and 10% of the weight of the said ethylenic compound, and condensing the vapors of said ethylenic compound.

3. A process for purifying a volatile polymerizable ethylenic compound which comprises mixing a said compound and a fulvene, heating the resulting mixture at a temperature at which said compound vaporizes, and collecting the resulting vapors, said fulvene having the formula

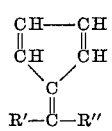

wherein R' represents a member of the class consisting of the phenyl, chlorophenyl, bromophenyl, alkylphenyl with up to eight carbon atoms in the alkyl portion thereof, phenylphenyl, and naphthyl groups, and R" represents a member of the class consisting of phenyl, chlorophenyl, bromophenyl, alkylphenyl with not over eight carbon atoms in the alkyl portion thereof, phenylphenyl, and alkyl groups of not over four carbon atoms, the amount of said fulvene in the resulting mixture being between 0.01% and 10% of the weight of the said ethylenic compound.

4. A process for purifying polymerizable monovinylidene compounds which comprises mixing a said compound with 0.1% to 5% of a fulvene of the structure

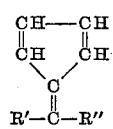

where R' is a member of the class consisting of the phenyl, chlorophenyl, bromophenyl, alkylphenyl with up to eight carbon atoms in the alkyl portion thereof, phenylphenyl, and naphthyl groups and R" is selected from the class consisting of phenyl, chlorophenyl, bromophenyl, alkylphenyl with not over eight carbon atoms in the alkyl portion thereof, phenylphenyl, and alkyl groups of not over four carbon atoms, heating the resulting mixture at a temperature at which said compound vaporizes, and condensing and collecting the resulting vapors.

5. A process according to claim 4 in which the vinylidene compound is a volatilizable acrylic ester.

6. A process according to claim 4 in which the vinylidene compound is a volatilizable methacrylic ester.

7. A process according to claim 4 in which the vinylidene compound is a volatilizable acrylamide.

8. A process according to claim 4 in which the vinylidene compound is a volatilizable methacrylamide.

9. A process according to claim 4 in which the vinylidene compound is a volatilizable N-alkylmaleimide.

No references cited.